Patented Apr. 27, 1954

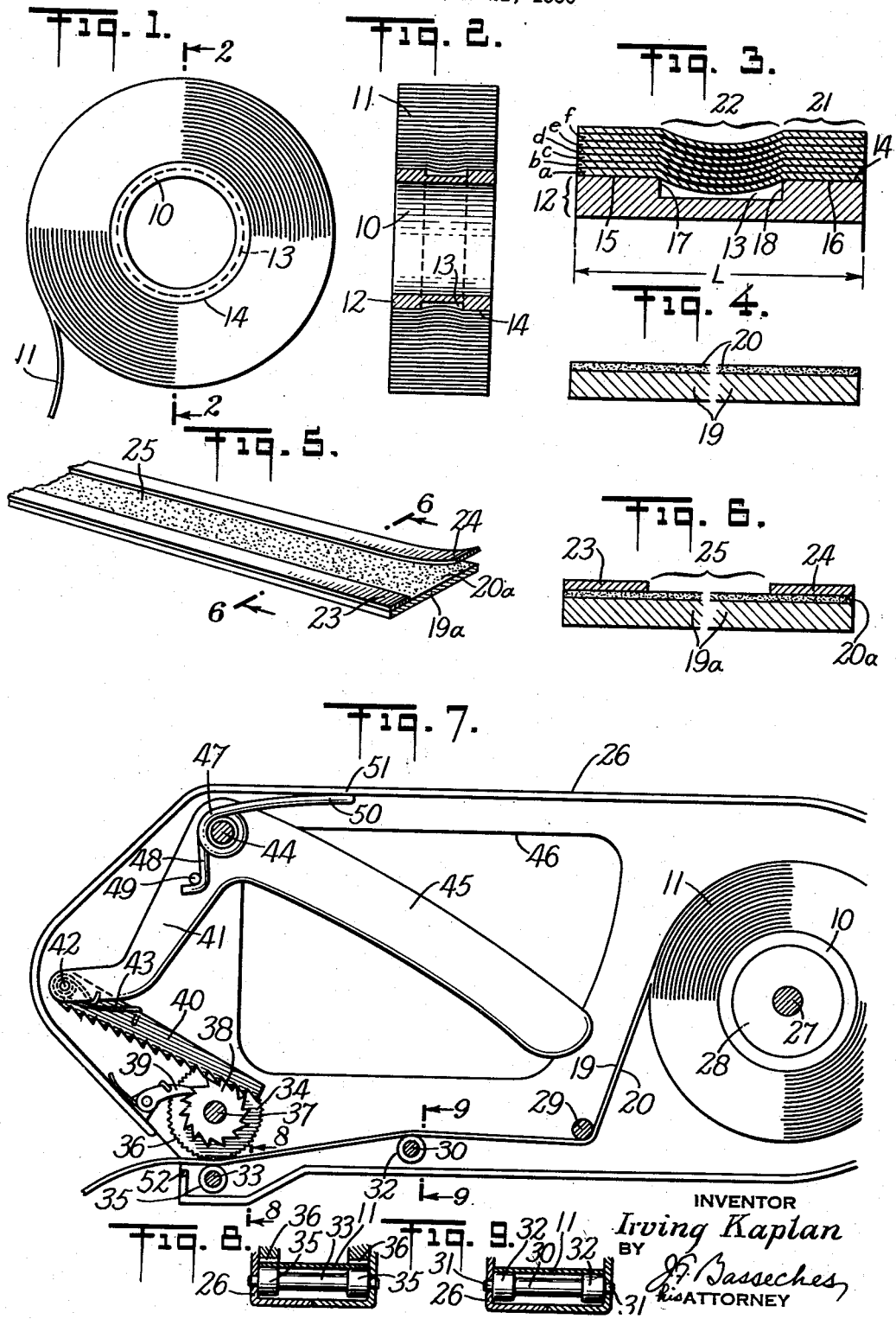

2,676,765

UNITED STATES PATENT OFFICE 2,676,765

PRESSURE SENSITIVE ADHESIVE TAPE AND CORE

Irving Kaplan, Flushing, N. Y.

Application January 21, 1950, Serial No. 139,953

5 Claims. (Cl. 242—68)

This invention relates to adhesive tapes; more particularly to rolls of adhesive tapes and still more particularly to spools or cores therefor and dispensing means for such tapes.

It is an object of my invention to provide for use in mounting pressure sensitive adhesive tape, such as masking tape of non-scuffing or tear resisting backing carrying united thereto a layer of pressure sensitive adhesive tape or a backing such as regenerated cellulose having a coating of pressure sensitive adhesive of the type generally referred to as sealing tapes, means whereby economy is effected in the dispensing of strips of tape from a roll, spool or core and to make more convenient the dispensing of strips of tape from a roll.

For convenience of reference I will refer herein to pressure sensitive adhesive tape as any of the aforementioned tapes comprising masking tape, whether flat back paper or creped paper integrated to resist lamination to a substantial degree, or formed with a backing coating which resists the tacky adhesion of the film or coating of pressure sensitive adhesive on the reverse side. These forms of pressure sensitive adhesive tape may include films of regenerated cellulose, cellulose acetate, nylon or other integrated or plasticized film forming material treated to form an integrated sheet on which there is carried united thereto a film of pressure sensitive adhesive. Illustrative of the type of pressure sensitive adhesive contemplated by me are the adhesive tapes made under the patents to Drew 1,760,820 and 2,177,627.

Pressure sensitive adhesive tapes as herein designated, when convoluted or rewound upon spools, cores of continuous cylindrical periphery actively adhere even though removable by stripping forces exerted as recognized in this field. The adhesive contact may be so energetic that normal manual means for stripping the same from a roll is attended with unusual care, or very frequently results in tearing the strip. When wound upon a spool or core made of laminated cardboard, the union is so intense that a substantial length of tape is lost for use or, if embodied in a dispensing device, stripping of the last remnants of tape is prevented, to make rethreading of a new batch difficult, and to result in a wasting of even more than a length which sticks to the core.

While I have found that by edging the tape with a liner formed as a folded edge of the tape located at such edges, the handling of the unrolling of the tape is simplified, the pressure of winding on a roll with such liner directs the pressure sensitive adhesive coating into pressure contact with the underlying surface, even though the liner, whether as a separate element or as an edging, minimizes the exposed area of pressure sensitive adhesive. I have found that by the provision of a spool or core upon which the pressure sensitive adhesive tape is wound which localizes the pressure contact to a relatively small area of the transverse section of the tape, that normal rewinding tension may be applied to leave a substantial section, bringing an adhesive and back surface contiguous without energetic contact, thereby to reduce the force necessary to strip the tape from the roll and to make available every section of the tape for removal from the core or spool.

I have found that by the provision of a windup spool or roll having transverse areas which relieve the contacting pressure of winding a convolution or roll of tape is produced which strips readily by manual means and minimizes tearing. I have found that rolls or spools having a cut-away belt to localize the pressure contact of winding and leave along the length of the tape other areas which are not convoluted under wind-up pressure that stripping manually is made possible. Furthermore, I have found that by the provision of a core having a belt portion cut away from the cylindrical surface thereof that during winding the convolutions are arranged to provide localized contacting portions, with rapidly removable segments along the length of the tape, which facilitates rapid stripping.

Still more particularly I have found that by the provision of a core or spool having only edgewise contact and a clearance belt portion which relieves the tension of winding, pressure sensitive adhesive tape may be wound thereon and combined in a manually operable dispenser to permit stripping from the roll without danger of tearing or employing an inordinate mechanical force to effect the stripping thereof.

Accordingly it is an object of my invention to provide in combination with a dispenser for pressure sensitive adhesive tape, a roll having a spool on which the tape is wound, permitting the employment of pressure sensitive tape having the pressure sensitive adhesive coating continuous or discontinuous, and to permit facile stripping of the same from the roll thereof or the core thereof without loss.

To attain these objects and such further objects as may appear herein or be hereinafter pointed out, I make reference to the accompanying drawing forming a part hereof in which—

Figure 1 is a plan view of a roll of tape in accordance with my invention;

Figure 2 is a section taken on the line 2—2 of Figure 1;

Figure 3 is a magnified fragmentary section of the core or spool in accordance with my invention;

Figure 4 is a magnified section of a tape in accordance with my invention;

Figure 5 is a perspective view of a tape in accordance with another embodiment of my invention;

Figure 6 is a section taken on the line 6—6 of Figure 5;

Figure 7 is a plan view showing a roll of tape with a manually operable dispensing assembly;

Figure 8 is a fragmentary section taken on the line 8—8 of Figure 7;

Figure 9 is a fragmentary section taken on the line 9—9 of Figure 7.

Summarizing my invention, I provide a core or spool upon which pressure sensitive adhesive tape may be wound and a roll employing such spool in which a generally cylindrical spool is formed, with a belt portion cut away to provide localized areas specifically at the edges, leaving intermediate sections along the length of the tape wound thereon without any pressure contact or with such contact as will confine the stripping force to a small area, to permit ready stripping and eliminate the necessity for a liner or edging heretofore necessary by me to facilitate stripping of tape from the roll for handling by mechanical feeders or dispensing contrivances. My invention likewise involves the provision of a wind-up roll or spool for pressure sensitive adhesive tape, the roll of tape and the dispenser employing the same, which facilitates ready stripping by a minimum force employing a flat or continuously coated tape with which direct contact may be made with dispensing rolls, without fear of jamming the dispensing mechanism or tearing the strip during the dispensing operation.

Making reference to the drawing, I provide a roll or spool 10 on which the pressure sensitive adhesive tape 11 is wound. The spool 10 in accordance with my invention comprises a core of cardboard built up by laminations of paper or similar board into a relatively rigid core. In accordance with my invention for a roll of tape having a 1" center and a wall 12 built up by laminations of paper to 1/8" thickness, I form a belt or annular slot 13 of a depth of 1/16" from the periphery 14. For a 7/8" width roll in the length L I provide rims 15 and 16 of approximately 1/4" each, leaving a clearance portion of 3/8" between the walls 17 and 18, respectively.

With this type of core or spool, winding of pressure sensitive adhesive tape is improved for dispensing purposes, as will appear hereinafter.

The form of pressure sensitive adhesive tape contemplated by me may be that shown in Figures 4, 5 and 6. In Figure 4 the simplest form of tape is illustrated comprising a backing 19 and a pressure sensitive adhesive layer 20. The backing may be unified paper—that is, paper which has been treated to unify the fibrils and prevent splitting, and crepe paper unified with a binder is an exemplified form of such material. Other non-splitting types of backing may be employed, such as creped paper having its fibrils unified, or foils of regenerated cellulose, cellulose acetate, metal foil.

The winding of tape upon the spool in accordance with my invention is illustrated in Figures 1 and 2 and in magnified form in Figure 3. The plies $a$, $b$, $c$, $d$, $e$ and $f$ shown in Figure 3 when wound upon the spool, in accordance with my invention, result in a tensioned segment 21 and a relaxed segment 22.

By way of offering an explanation as to the effect produced by winding on a spool in accordance with my invention wherein there is a tensioned portion and a relaxed portion, I point out that the high portions 15 and 16 bring the adhesive surface of the tape in contact with the back surface of the overlying convolution in pressure contact, requiring a magnitude of considerable force to strip the sheet from adhesive contact, whereas the portions of the spool which are free from pressure contact, such as at the belt slot, serve to bring the plies together in a way to require little, if any, stripping force.

By a relationship of the relaxed surface to the tensioned surface, a varying degree of union of the plies is secured, to minimize the stripping force necessary to dispense the tape, it being understood that the clearance space, such as the belt slot 13, should not be so great as to permit distortion of the tape into the slot during the winding operation, the stripping force along the length of the tape in accordance with my invention being less than the adhesive force across the full width of the tape.

While I prefer to use tape in which the adhesive surface and the backing are co-terminous, I may still further reduce the stripping force to unwind a roll by the employment of a tape shown in Figure 5 wherein a backing 19a has a pressure sensitive adhesive layer 20a covered by its edges with an edging of liner strips 23 and 24, such as strips of cellophane, to leave an exposed area 25 for pressure sensitive adhesive contact. A roll of tape in accordance with my invention may be employed in a tape dispenser having manual stripping means, illustrated in Figure 7, and to effect some highly desirable effects in the dispensing of the tape especially for more or less one hand manual operation.

For this purpose there is shown in Figure 7 a dispensing frame 26 comprising a shallow channel metal stamping, with one side plate removed to show the interior. In this construction a trunnion shaft 27 supports a roll 28, to receive the spool 10 previously described, carrying the convoluted pressure sensitive adhesive tape. In the illustration the tape is convoluted so that the adhesive surface 20 is on the inner face and the back surface 19 is on the outer face. In this position the web is guided over the guide pin 29 and the guide roll 30, which rotates on the guide pin 31. The guide roll 30 is formed with end flanges 32, to limit the adhesive contact to the side edges of the tape. The tape then is directed between the secondary guide roll 33 and the feed roll 34. Rolls 33 and 34 have end flanges 35 and 36, respectively, to grip the tape at the side edges only.

Feed roll 34 is mounted on a shaft 37. This shaft has keyed thereon the ratchet wheel 38. A spring pressed pawl 39 may be employed to limit the rotation of the feed roll 34 in one direction. The ratchet wheel is driven by the rack arm 40, pivotally mounted on the lever 41 at its end 42, spring 43 being employed to yield and clear the ratchet wheel 38 on the return stroke, as will be understood from the description which follows.

The lever 41 is pivoted on the shaft 44. A hand grip 45 is extended to be accessible through the clearance slot 46 of the frame 26. A coiled spring 47 is mounted on the pin 44 to have one end 48 biased against the pin 49 and the opposite end 50 biased against the side 51 of the frame 26.

By the construction as described, gripping the lever 45 serves to drive the ratchet wheel and, in turn, the feed roll 34 by an angular displacement effect by the hand grip 45. Return movement of the spring grip 45 causes the ratchet 40 to ride without movement of the feed roll 34 as previously described. Cutting means, such as a knife edge, may be provided adjacent the edge 52 to sever a predetermined section of tape, and for this purpose gripping means may be employed to hold the feed roll and guide roll 33 and 34 against movement during such severing operation.

The assembly which I have provided with the roll of tape mounted upon the core as described permits ready feeding and dispensing of pressure sensitive adhesive tape, whether of the plain type, as shown in Figures 3 and 4, or provided with a liner, such as shown in Figures 5 and 6. A minimum of manual force is necessary to strip the tape from the roll, permitting the employment of backing for the tape of thicknesses heretofore deemed unsuitable as too weak for use in stripping pressure sensitive adhesive tape from a roll. Likewise, a variation in tack of the adhesive will not adversely affect the stripping and dispensing operation from a roll, thereby allowing for greater latitude in use of adhesive of pressure sensitive character.

Furthermore, the minimizing of the active contact of the convolutions of the tape permits of economy in that the last length of the convolution of tape may be employed without waste.

It will thus be observed that I have provided a new spool for mounting pressure sensitive adhesive tape, including a roll of tape for facilitating the dispensing of this material, and a combination manually operable dispenser for quickly furnishing a strip of this packaging material.

Having thus described my invention and illustrated its use, what I claim as new and desire to secure by Letters Patent, is:

1. A roll of adhesive tape of substantial width, a core of similar width on which said roll is mounted, said core having a belt slot on its outer face to provide contact and depressed surfaces, said roll touching said contact surface and extending into said slot but out of adhesive contact with said depressed surface.

2. A roll of adhesive tape of substantial width, a core of similar width on which said roll is mounted, said core having a belt slot on its outer face to provide contact and depressed surfaces, said roll touching said contact surface and extending into said slot but out of adhesive contact with said depressed surface, the width of said contact surface being greater than the width of said depressed surface.

3. A roll of adhesive tape of substantial width, a core of similar width on which said roll is mounted, said core having a belt slot on its outer face to provide contact and depressed surfaces, said roll touching said contact surface and extending into said slot but out of adhesive contact with said depressed surface, said slot being within the body of the core.

4. A roll of adhesive tape of substantial width, a core of similar width on which said roll is mounted, said core having a belt slot on its outer face to provide contact and depressed surfaces, said roll touching said contact surface and extending into said slot but out of adhesive contact with said depressed surface, the depth of said slot being about $\tfrac{1}{16}$ inch.

5. A roll of adhesive tape of substantial width, a core of similar width on which said roll is mounted, said core having a belt slot on its outer face to provide contact and depressed surfaces, said roll touching said contact surface and extending into said slot but out of adhesive contact with said depressed surface, said tape having an adhhesive surface and an edging strip covering that portion of said adhesive surface adjacent to at least one of the edges of said tape.

References Cited in the file of this patent

UNITED STATES PATENTS

| Number | Name | Date |
| --- | --- | --- |
| 1,441,543 | Tainsh | Jan. 9, 1923 |
| 1,908,425 | Hunt | May 9, 1933 |
| 1,972,850 | McCarthy | Sept. 4, 1934 |
| 1,981,229 | Gillet | Nov. 20, 1934 |
| 2,140,065 | Waechter | Dec. 13, 1938 |
| 2,307,406 | Howard | Jan. 5, 1943 |
| 2,395,668 | Kellgren | Feb. 26, 1946 |
| 2,565,509 | Marciu | Aug. 28, 1951 |

FOREIGN PATENTS

| Number | Country | Date |
| --- | --- | --- |
| 324,217 | Great Britain | Jan. 23, 1930 |